United States Patent [19]

Bulle

[11] 4,186,575
[45] Feb. 5, 1980

[54] TRAILER HITCH RING LOCK

[76] Inventor: Marshall R. Bulle, 918-3rd St., Farmington, Mich. 55024

[21] Appl. No.: 947,484

[22] Filed: Oct. 2, 1978

[51] Int. Cl.² .................. B60R 25/00; E05B 27/36
[52] U.S. Cl. ........................................... 70/14; 70/34
[58] Field of Search .......................... 70/14, 32–34, 70/23, 57, 58, 258

[56] References Cited

U.S. PATENT DOCUMENTS

| 1,468,027 | 9/1923 | Lindberg | 70/23 |
| 3,844,143 | 10/1974 | Hudson | 70/14 |

FOREIGN PATENT DOCUMENTS

| 545715 | 7/1922 | France | 70/34 |
| 861059 | 12/1952 | Fed. Rep. of Germany | 70/14 |

Primary Examiner—Robert L. Wolfe
Attorney, Agent, or Firm—Donald A. Jacobson

[57] ABSTRACT

A lock apparatus comprising two parts which are secured together through the ring of a trailer hitch tongue to prevent the unauthorized use of the trailer. The two parts comprise mating first male and first female cylinders attached to first and second circular plates respectively, and a second male member externally threaded cylinder, mounted co-axially within the first female cylinder also attached to the second plate. The interior of the first male cylinder is threaded to provide a second female threaded surface to mate with the second threaded male cylinder. The first unthreaded female cylinder attached to the second plate has a number of slots parallel to its axis about its periphery. A pivotable bar is mounted flush within a slot in the outer surface of the first male internally threaded cylinder. The bar can be rotated by a cam attached to a conventional key operated cylinder lock, to positions within the slot or extending outwardly therefrom. The two parts are secured together through the ring by engaging and tightening the threads with the bar retracted, until the first and second plates engage the ring whereupon the key is used to operate the cam to extend the bar outwardly, in this position the bar can engage one of the slots in the first unthreaded female cylinder thereby locking the two parts in place.

6 Claims, 5 Drawing Figures

TRAILER HITCH RING LOCK

BACKGROUND OF THE INVENTION

I. Field of the Invention

This invention relates generally to locking mechanisms and relates particularly to an apparatus which is locked within the eye of a trailer tongue to prevent the unauthorized movement of the trailer.

II. Description of the Prior Art

There are a number of locks made to secure one item within another to prevent unauthorized use or unauthorized access using a cylinder having tumblers operated by a key. This structure is revealed in U.S. Pat. Nos. Feller, 2,742,726; Kruschwitz, 2,791,976; and Jacobi, 1,982,831.

In U.S. Pat. No. Hudson, 3,844,143, a pintle hook locking device for an eye of a trailer tongue is revealed. This lock requires a separate adjustment for pintle size and provides no protection for the lock cylinder or for forced removal.

No prior device known to me provides the combination of attributes of the present invention, namely, a simple strong attachment means providing automatic sizing for a number of ring sizes, continued positive locking even upon lock cylinder removal and lock cylinder guard means.

SUMMARY OF THE INVENTION

The locking device is extremely simple and rugged using coarse threads about and within large cylinders to provide great holding power. The bar which engages a slot to prevent unthreading the lock parts must be sheared off to permit the parts to be unthreaded without a key. Great strength is thus required for unauthorized removal whether by prying or by forced unthreading. The component parts are easily manufactured providing an inexpensive locking device of great strength.

OBJECTS

It is accordingly the principal object of the present invention to provide a new and improved lock which may be readily connected and disconnected from the ring of a trailer hitch, but which resists unauthorized efforts at disconnection.

It is another and more particular object to provide a lock which will adapt itself to a number of different sizes of trailer hitch rings.

It is yet another object of the present invention to provide a new and improved lock which is extremely rugged, simple in design, easy to use, with the minimum of operating parts.

DESCRIPTION OF THE PREFERRED EMBODIMENT

Figure 1:
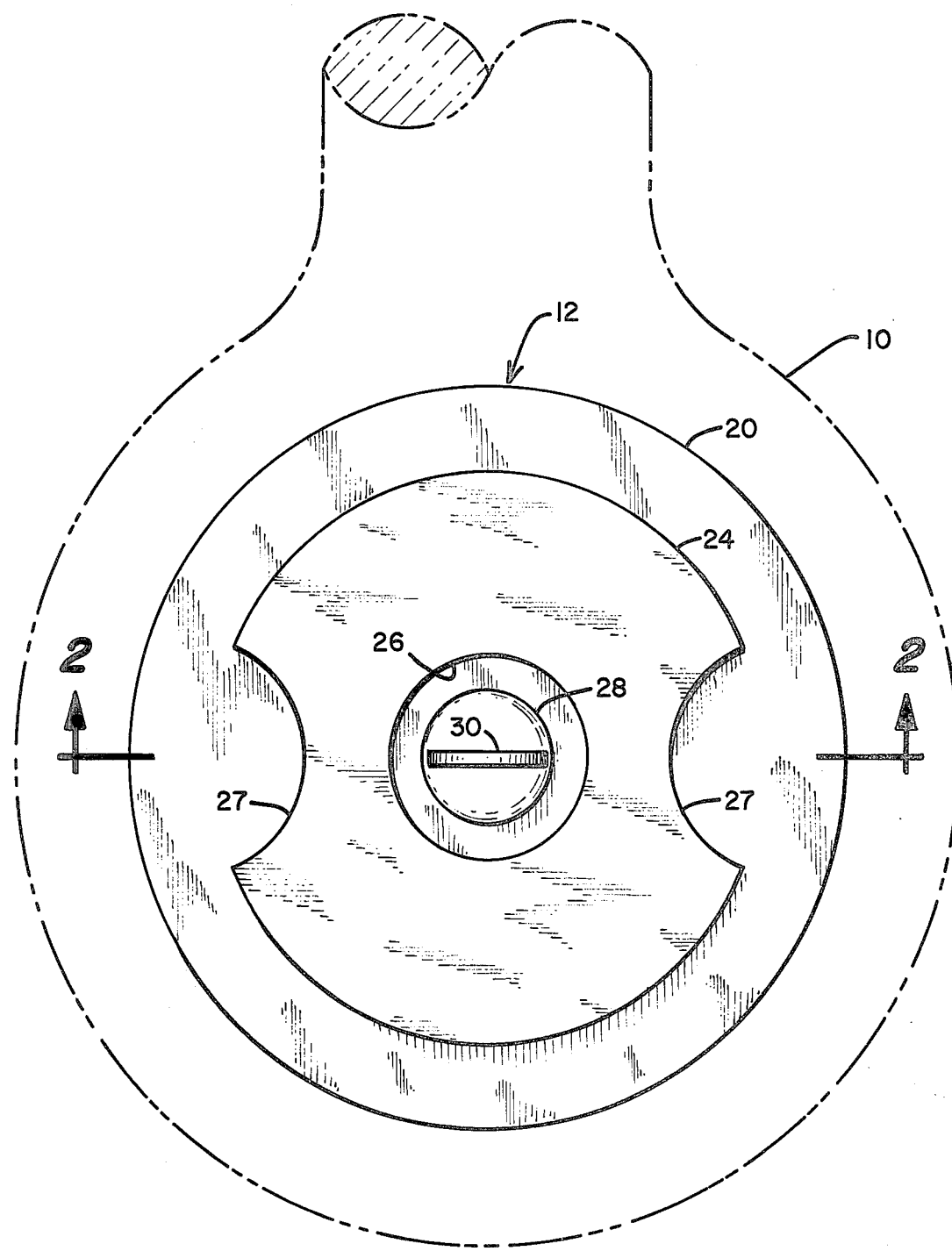
FIG. 1 is a plan view of one application of the invention mounted in a ring which is indicated in phantom outline.

Referring to FIG. 1, a trailer vehicle (not shown) has a towing attachment with an eye 10 to engage a pintle (not shown) of a towing vehicle. The opening of eye 10 is necessary to make an attachment to the trailer and blocking this opening makes the unauthorized movement of the trailer vehicle essentially impossible. The preferred embodiment of the trailer hitch ring lock, generally described as 12, is used to close the opening of eye 10 to prevent any unauthorized use of the trailer.

Figure 2:
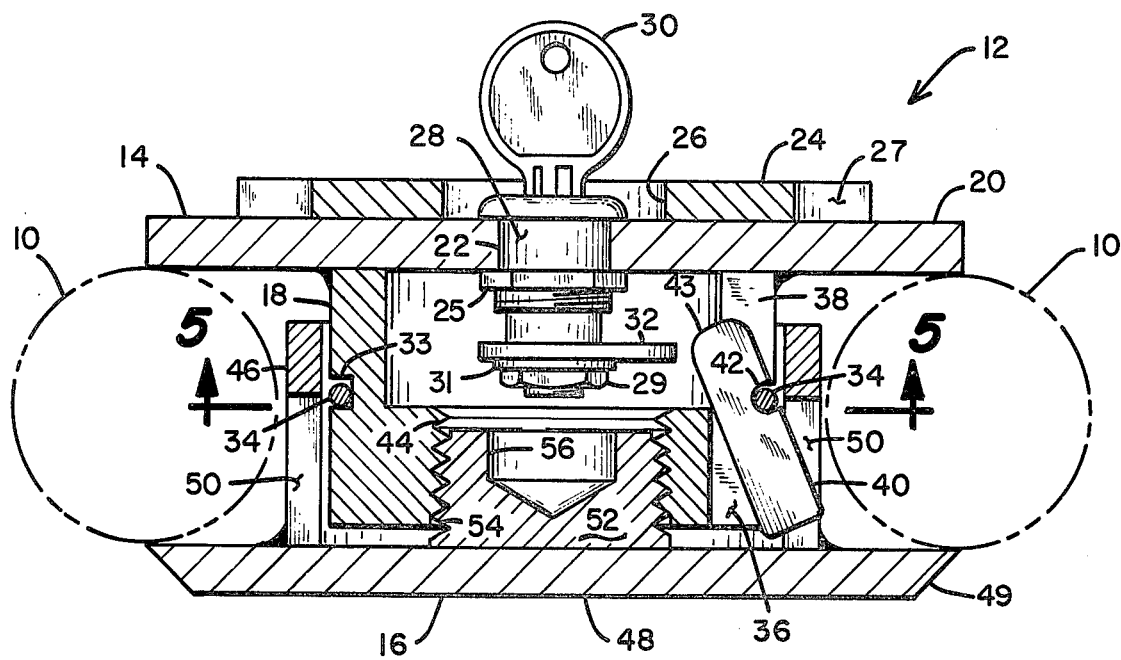
FIG. 2 is a cross-sectional view taken along line 2—2 in FIG. 1 with the lock engaged and the ring indicated in phantom outline.
Figure 4:
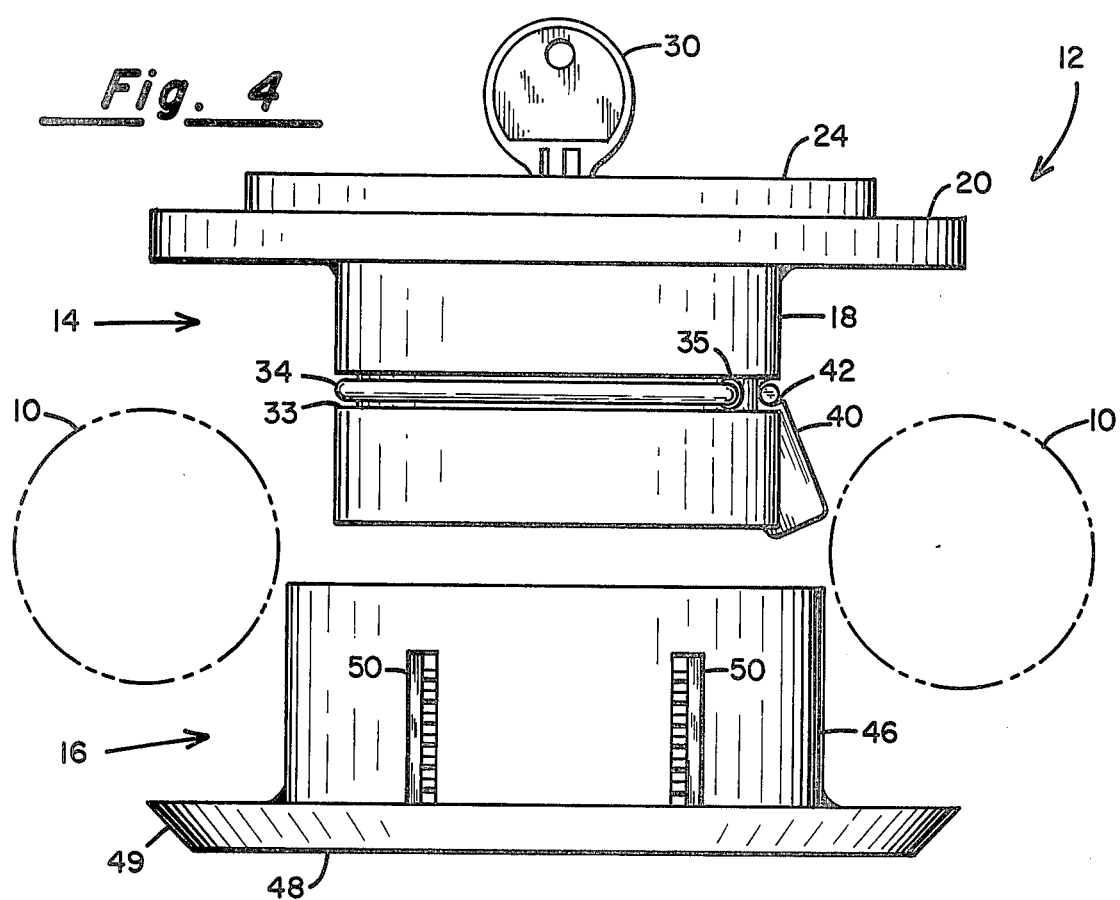
FIG. 4 is a side view of the two separate parts of the invention with the ring indicated in phantom outline.

Referring to FIG. 4, the ring lock consists of two matching members, a male member 14 and a female member 16. The male member 14 has a projection consisting of a steel cylinder 18 attached to a circular flat steel plate 20, which is perpendicular to the axis of the cylinder. Referring also to FIG. 2, plate 20 has a circular aperture 22. A circular flat steel plate guard 24, with a circular aperture 26 is attached coaxially to plate 20. Referring to FIG. 1, two opposing semi-circular cut outs 27 in the periphery of plate guard 24 provide a finger gripping surface for the operation of the lock, to be described later. Referring again to FIG. 2, a conventional lock cylinder 28, operated by a key 30, is mounted within aperture 26 and through aperture 22. A nut 25 holds cylinder 28 within plate 20. A cam 32 is attached to the inner mechanism of lock cylinder 28 using a washer 31 and a nut 29. The lock cylinder inner mechanism is rotated by key 30.

A slot 33 is formed completely about outer center portion of the surface of cylinder 18 parallel to plate 20 having a width and depth of approximately ¼ and ⅛ of the cylinder length respectively. Slot 33 contains a spring coil 34 consisting of a single turn. Referring also to FIG. 4, one end of coil spring 34 is bent perpendicular to the adjacent portion of the spring and inserted into a hole 35 in slot 32 to hold the spring in a fixed position. A second slot 36 in the outer surface of cylinder 18 is perpendicular and opposite to plate 20 and extends ½ of the length of the cylinder having a depth of approximately 80% of the cylinder thickness and a width approximately ½ as wide. A rectangular aperture 38 completely through cylinder 18 is formed by extending slot 36 completely through the cylinder for the second half of the cylinder length to plate 20. A rectangular bar 40 having a circular cut out 42 and one rounded end 43 is mounted partly in slot 36 and partly in aperture 38, and is held in place by the unrestrained end of spring 34 bearing against cut out 42. A coarse thread 44 is cut into the interior of cylinder 18.

Figure 5:
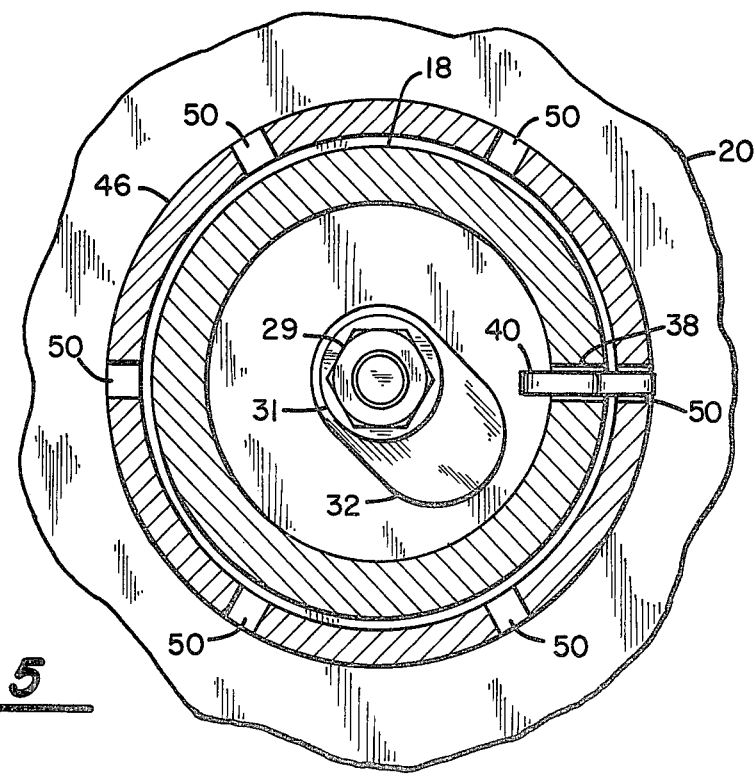
FIG. 5 is a cross-sectional view taken along line 5—5 in FIG. 2.

Referring to FIGS. 4 and 5, female member 16 consists of a steel cylinder 46 which is slightly larger than cylinder 18 attached to a steel plate 48 perpendicular to the cylinder axis. Plate 48 has a diagonal taper 49 about its entire periphery. Cylinder 46 has a set of six equally spaced slots 50 completely through the cylinder about its periphery. Slots 50 are perpendicular to plate 48 and extend from plate 48 approximately 4/5'ths of the length of the cylinder having a width slightly greater than the thickness of bar 40.

Referring to FIG. 2, a second smaller cylinder 52 having a diameter slightly less than cylinder 18 is mounted within cylinder 46 and also attached to plate 48 having its axis perpendicular to the plate. Cylinder 53 has coarse threads 54 cut into its outer surface which cylinder 52 and threads 54 are of a suitable size and depth to mate with threads 44 on cylinder 18. Cylinder 53 has a cup-shaped depression 56 centered about its axis and opposite to plate 48.

Figure 3:
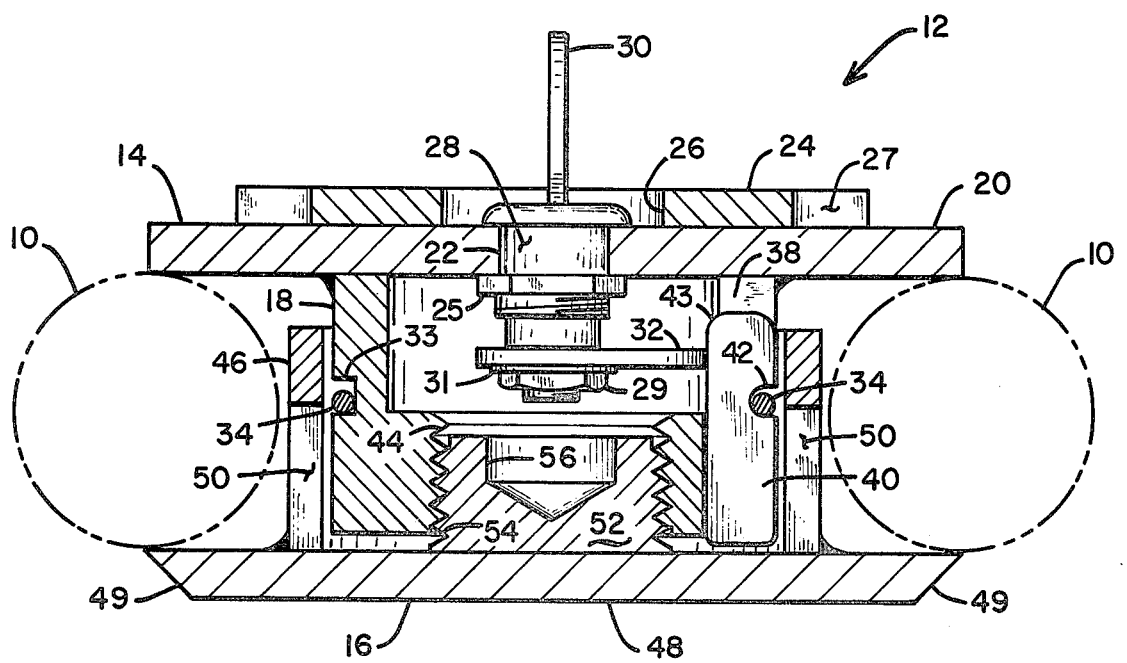
FIG. 3 is a cross-sectional view taken along line 2—2 in FIG. 1 with the lock disengaged and the ring indicated in phantom outline.

To attach this lock to a trailer hitch ring 10, male member 14 is aligned opposite female member 16 as illustrated in FIG. 4 with said ring interposed therebetween. Key 30 is rotated to position the lock cylinder 28 inner mechanism such that cam 32 bears against bar 40 thereby forcing end 43 outward, as shown in FIG. 3. The rectangular end of bar 42 is counter-rotated inward within slot 36 by this action. Member 14 is then inserted into ring 10 from one side and member 16 is inserted into said ring from the opposite side, until threads 44 and 54 engage. Member 14 is then rotated relative to member 16 by hand, using the cut outs 27 on plate guard 24 as a grip, in such a direction as to cause threads 44 and 54 to draw the two members together. This rotation is continued until plates 20 and 48 bear against ring 10 as shown in FIG. 3. Key 30 is then rotated 90° to the position shown in FIGS. 2 and 5 and removed. Note that the use of the interaction between threads 44 and 54, to bring plates 20 and 48 to bear against ring 10, provides a simple automatic sizing mechanism for a number of different size rings 10. The depression consisting of cup 56 in cylinder 52 permits the entry of nut 28 within cylinder 52 to increase the range of adjustment, in that plate 20 can be brought closer to plate 38 than would be possible without said cup.

The rotation of key 30 to the positions illustrated in FIGS. 2 and 5, rotates cam 32 to a position away from bar 40. With cam 32 in this position, spring 34 will tend to urge the rounded end 43 of bar 40 through aperture 38 into the center of cylinder 18 and simultaneously will tend to urge the rectangular end of bar 40 outwardly. If any one of the slots 50 on cylinder 46 is directly opposite bar 40, then the square end of said bar will enter slot 50 as illustrated in FIGS. 2 and 5. If not one of the slots 59 is opposite bar 40, then any attempt to remove member 14 from member 16 by rotating one member about the other will result in such an opposition, upon any relative rotation between members 14 and 16 of not more than 60°, whereupon the rectangular end of bar 40 will be forced into a slot 50 by the action of spring 34. The rotation of key 30 to the positions shown on FIGS. 2 and 5 and its removal are all that is necessary to secure the lock, since the rounded end 43 of bar 40 must be held outward by cam 32 to prevent the rectangular end of said bar from engaging a slot 50. This provides an additional high degree of security, in that even if cylinder 28 is forcibly removed, this will not permit the rotation and separation of member 14 from member 16. Plate guard 24 provides additional protection for lock cylinder 28 and additional reinforcement for plate 20.

Threads 44 and 54 are coarse to increase the amount of thread depth and engagement. The mating of threads 44 and 54 about such a large cylindrical radius results in a tremendous sheer strength which makes prying members 14 and 16 apart extremely difficult particularly since said members both contact ring 10 and, consequently, providing no opening for a wedge.

As an additional protection, diagonal taper 49 on plate 48 provides no purchase for a wrench or other similar tool in any attempt to force the rotation of member 14 about member 16. Further, the strength of steel cylinder 18 and 46 and of steel bar 40 provide great opposition to any such rotation when bar 40 is located within a slot 50; for any rotation of members 14 and 16 to occur, a corner of steel bar 40 must be sheered completely off which requires a tremendous coupling force.

This trailer hitch ring lock provides a rugged locking action which is simple to attach, adjusts to a number of ring sizes by merely rotating one part relative to the other, and is extremely difficult to remove by force.

Although specific construction of the herein disclosed lock has been shown and described, it is obvious that those skilled in the art may make various modifications and changes to them without departing from the scope and spirit of the present invention. It is to be expressly understood that the instant invention is limited only by the appended claims.

What is claimed is:

1. For use with a trailer type vehicle having a generally toroidal shaped coupling hook, locking apparatus for inhibiting the unauthorized use of said trailer comprising:
    (a) a first plate having an aperture therethrough and a tubular cylinder projecting from a first side surface thereof, said tubular cylinder being threaded over a predetermined portion thereof and having a longitudinally extending slot formed in the side wall thereof;
    (b) a bar member pivotally mounted in said slot;
    (c) a key operated lock assembly secured in said aperture and having a cam member affixed thereto for rotation when a key is inserted in said lock and turned, said cam member cooperating with said bar member for pivoting at least a portion of said bar member into and out of said slot; and
    (d) a second plate having first and second generally concentric cylinders extending outwardly from a first side thereof, said first cylinder on said second plate being tubular and having an inner diameter which is greater than the outer diameter of said cylinder projecting from said first plate and having at least one longitudinal slot formed in the side wall thereof, said second cylinder on said second plate being threaded along a portion thereof, the arrangement being such that when the key operated lock is in a first condition, said threaded portions of said cylinder projecting from said first plate may be engaged with the threaded portion of said second cylinder projecting from said second plate by rotating said first plate relative to said second plate, but when said key operated lock is in a second condition, said bar will extend outward from said longitudinal slot in said tubular cylinder projecting from said first plate and into said longitudinal slot formed in the side wall of said first concentric cylinder projecting from said second plate to prevent relative rotation of said first and second plates.

2. The device as in claim 1 wherein the outer diameter of said first cylinder projecting from said second plate is dimensioned to fit through the aperture of said toroidal coupling hook and said first and second plates are sized to completely block said aperture of said coupling hook when the threaded portions of said cylinders are engaged.

3. The device as in claim 1 and further including:
    (a) a circular notch formed in the outer surface of the side wall of said cylinder projecting from said first plate; and
    (b) a spring element disposed in said notch for pivotally mounting said bar.

4. Apparatus as in claim 1 wherein said second plate is circular and its periphery is tapered.

5. Apparatus as in claim 1 wherein said cylinder projecting from said first plate is internally threaded and said second cylinder projecting from said second plate is externally threaded.

6. Apparatus as in claim 1 and further including:
(a) a reinforcing plate having an aperture formed centrally therein and affixed to the second side of said first plate, said aperture in said reinforcing plate providing access to the key hole in said key operated lock; and
(b) first and second arcuate recesses formed inwardly from the side edges of said reinforcing plate to provide finger gripping zones for facilitating the rotational engagement of said threaded portions of said cylinder projecting from said first plate and said second cylinder projecting from said second plate.

* * * * *